Aug. 29, 1967 A. L. COULTER 3,338,550
TOGGLE VALVE
Filed Oct. 24, 1965 4 Sheets-Sheet 3
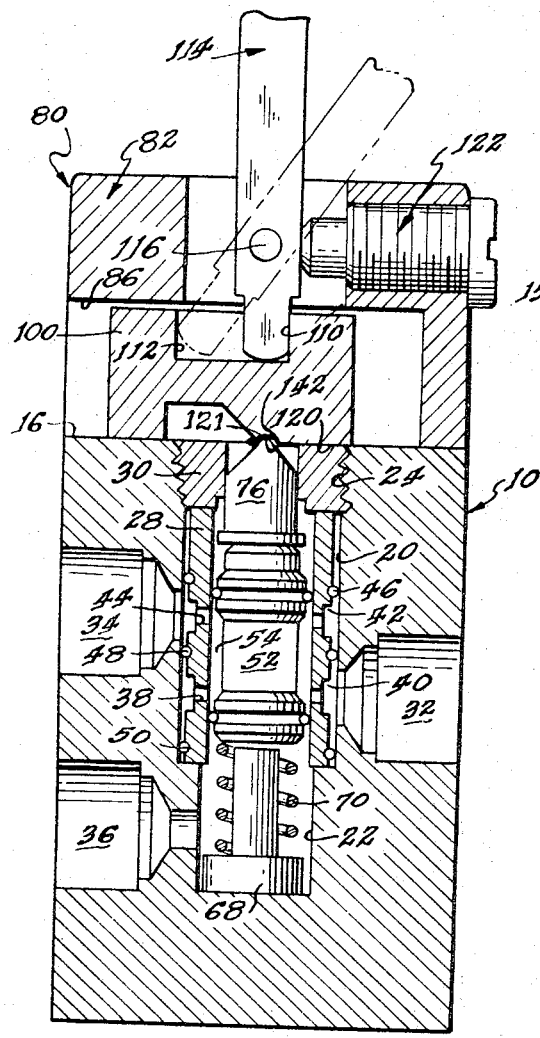
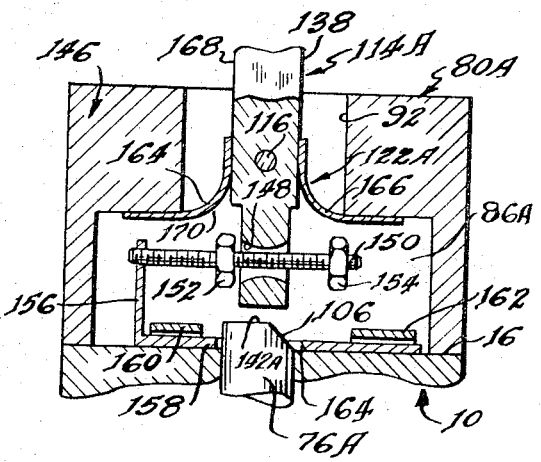
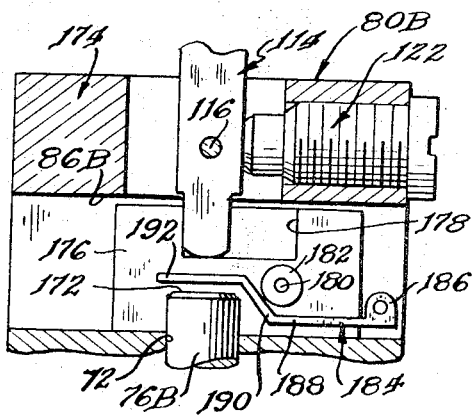
Inventor
Albert L. Coulter
By:
Frost, Burmeister & Kulie
Attorneys

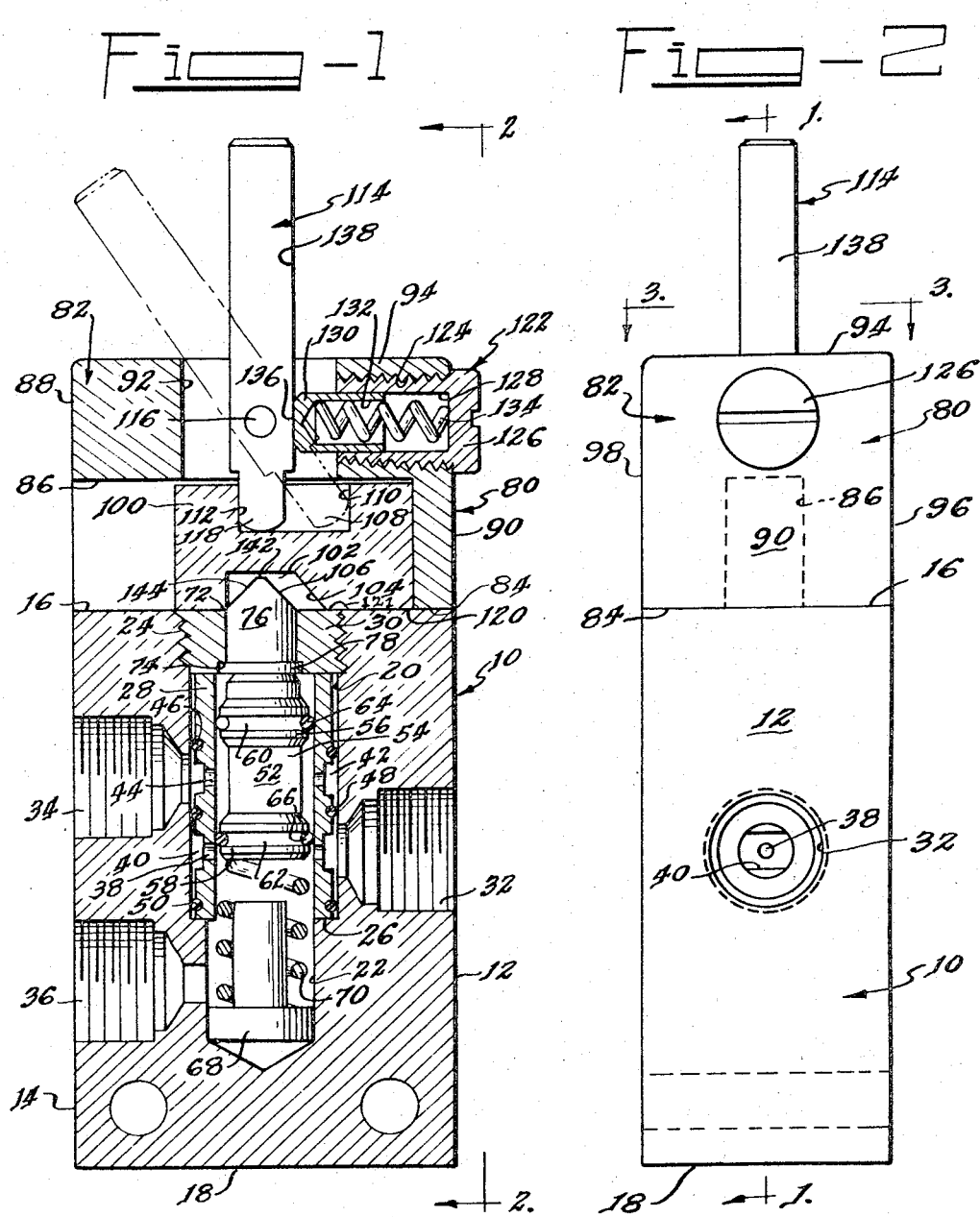

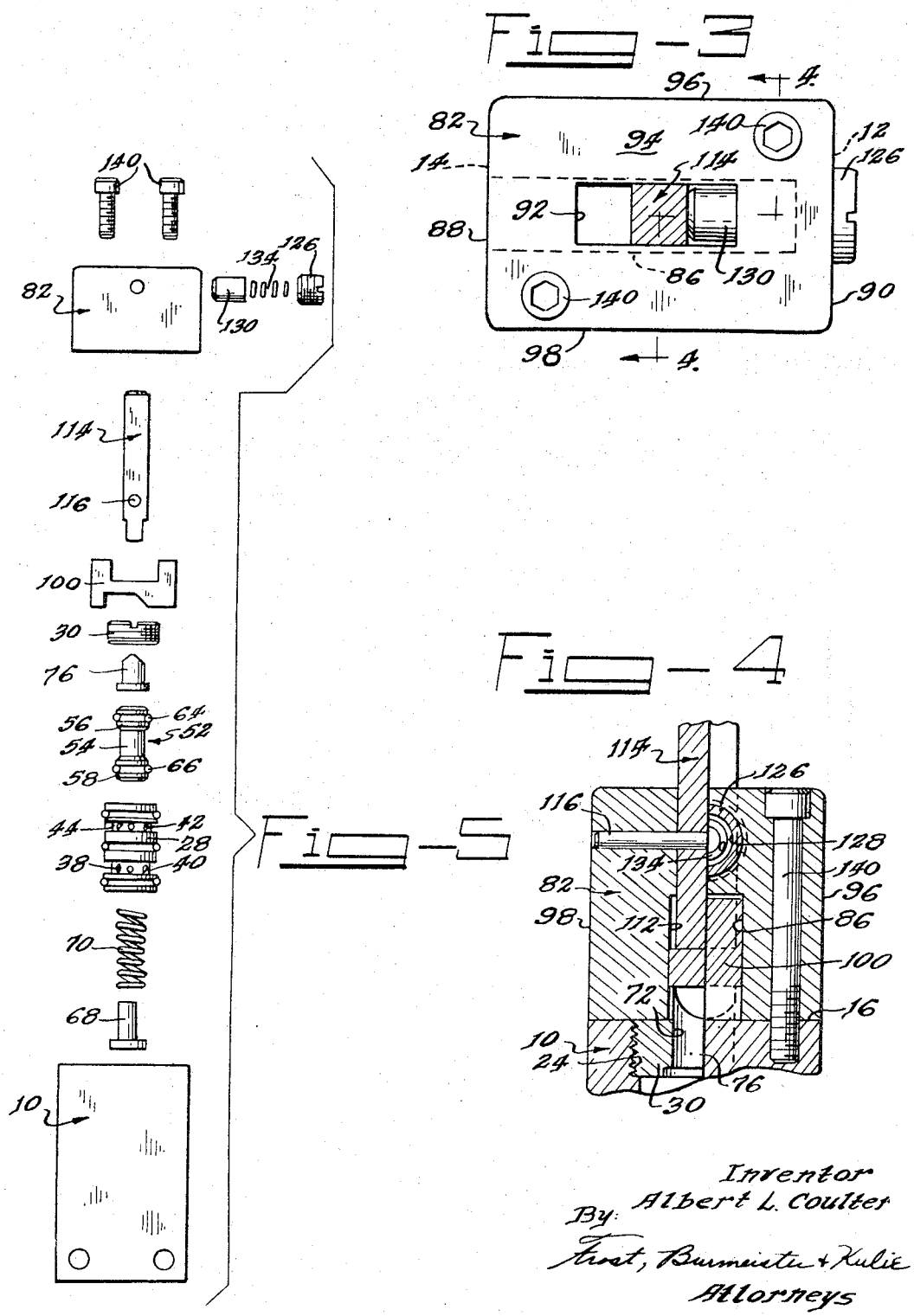

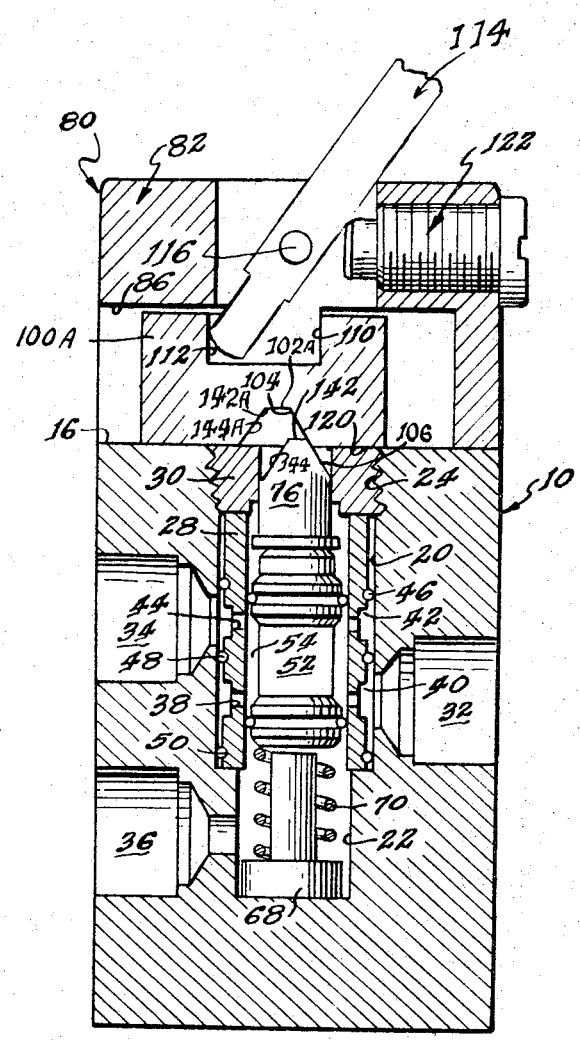

United States Patent Office 3,338,550
Patented Aug. 29, 1967

3,338,550
TOGGLE VALVE
Albert L. Coulter, McHenry, Ill. 60050
Filed Oct. 24, 1965, Ser. No. 504,798
14 Claims. (Cl. 251—263)

This application is a continuation-in-part of my earlier filed application Ser. No. 310,736, filed Sept. 23, 1963, now abandoned.

The present invention relates generally to hydraulic and pneumatic valves, particularly to valves of this type which are actuated by a mechanical pulse and remain in the condition established by the mechanical pulse after the pulse terminates. The present invention is particularly directed to toggle valves which may be set in one condition by a mechanical force and which will remain in that condition until actuated by a second mechanical force directed in a direction opposite to that of the first mechanical force.

A toggle valve may be considered to be the combination of a valve for interrupting the flow of fluid and an actuating mechanism mounted on the valve which has a control arm pivotally mounted on the actuating mechanism. The valve itself has a control member, such as a translatable stem, which is driven by the actuating means, and the control member itself may be responsive to rotation or translation to affect control of the fluid passing through the valve. Prior to the present invention, toggle valves have been known to the art, but these valves have control arms which rest in one of two positions depending upon the condition of the control member of the valve. In other words, when the arm of the actuating mechanism is pivoted in one direction to open the valve, it remains in that position as long as the valve remains open. When the valve is closed by pivoting the control arm in the reverse direction, it remains in a second position during the period in which the valve is closed.

For some purposes it is desirable that the control arm be in the same rest position regardless of whether the valve is open or closed. For example, a valve which is to be actuated by the movement of a carriage between its open and closed positions preferably has a control arm which is disposed perpendicular to the translational axis of the carriage regardless of the direction of travel of the carriage. If the control arm of the actuation means of a toggle valve is perpendicular to the axis of translation of the carriage, greater accuracy can be achieved in correlating the position of the carriage with the transition of the valve. One of the reasons for this greater accuracy is that the position of the control arm of the actuating means may itself be directly used to create the transition of the valve, rather than having the control arm actuate a spring mechanism for effecting the transition which is generally the mechanism employed by the toggle valves of the prior art. Further, there is an advantage to apply a force perpendicuflar to the control arm of the actuating means of the toggle valve, rather than to apply the force through a disadvantageous angle as in the case of prior constructions.

It is therefore an object of the present invention to provide a novel actuating means for a valve which is responsive to a mechanical pulse to actuate the valve from one condition of control to another.

It is a further object to provide a novel toggle valve which has a pivoted control arm which assumes the same rest position whether the valve is actuated to one of its conditions or the other.

These and other objects of the present invention will be readily apparent from a further consideration of this disclosure, particularly when viewed in light of the drawings, in which;

FIGURE 1 is a sectional view of a toggle valve constructed according to the teachings of the present invention, the section being taken along the line 1—1 of FIGURE 2;

FIGURE 2 is a side elevational view of the toggle valve of FIGURE 1, the line 2—2 of FIGURE 1 indicating the plane of the figure;

FIGURE 3 is a sectional view taken along the line 3—3 of FIGURE 2;

FIGURE 4 is a sectional view taken along the line 4—4 of FIGURE 3;

FIGURE 5 is an exploded view showing the parts employed in the toggle valve illustrated in FIGURES 1 through 4;

FIGURE 6 is a sectional view taken along the same plane as FIGURE 1 showing the toggle valve of FIGURES 1 through 5 actuated to the opposite condition of FIGURE 1;

FIGURE 7 is a fragmentary sectional view taken along the same plane as FIGURE 1 of a second embodiment of the actuating mechanism for a toggle valve;

FIGURE 8 is a sectional view taken along the same plane as FIGURE 1 illustrating a third embodiment of the actuating mechanism for a toggle valve; and FIGURE 9 is a sectional view on the same plane as FIGURES 1 and 6 showing a modified toggle valve construction.

FIGURES 1 and 6 illustrate a two way valve, although it is to be understood that the present invention may be practised with a simple one way valve, or any other type of valve construction which may be actuated by a toggle actuator mechanism. The valve illustrated has a valve block 10 constructed of corrosion resistant solid material, such as brass, which is quadrangular in configuration. The valve block 10 has side walls 12 and 14 and end walls 16 and 18 which are flat. A cylindrical bore 20 extends into the block 10 centrally of the end wall 16 and perpendicular thereto. The bore 20 has a restricted portion 22 adjacent to its end opposite the end wall 16, and a threaded mouth 24 adjacent to the end wall 16. The restricted portion 22 forms a shoulder 26, and a cylindrical sleeve 28 is disposed within the bore 20 with one end abutting the shoulder 26. An externally threaded spacer 30 is disposed within the mouth 24 of the bore 20 and locks the sleeve 28 between the shoulder 26 and the spacer 30.

The block 10 has an inlet port 32 which extends therein from the side wall 12 and communicates with the bore 20. In like manner, a first outlet port 34 and a second outlet port 36 extend into the block 10 from the side wall 14 and communicate with the bore 20. The inlet port 32 communicates with the bore 20 approximately mid-way between the outlet ports 34 and 36, as measured along the axis of the bore 20, and the outlet port 36 communicates with the restricted portion 22 of the bore 20. The sleeve 28 is provided with a plurality of apertures 38 disposed in a plane normal to the axis of the bore 20 and directly confronting the inlet port 32. Also, the sleeve 28 has a circular groove 40 extending about its exterior surface and communicating with the apertures 38.

In like manner, a second groove 42 is disposed in a plane normal to the axis of the bore 20 about the exterior surface of the sleeve 28 confronting the first output port 34, and a plurality of apertures 44 extend from the groove 42 to the interior surface of the eleeve 28. The sleeve 28 is sealed to the surface of the bore 20 on opposite sides of the second groove 42 by O-rings 46 and 48, and the sleeve 28 is also sealed to the bore 20 on opposite sides of the groove 40 by an O-ring 48 and an O-ring 50 disposed on opposite sides of groove 40.

A spool 52 is slidably disposed within the sleeve 28. The spool 52 has a central portion 54 of reduced diameter and end portions 56 and 58 of increased diameter which are spaced by the restricted central portion 54. The end portions 56 and 58 are provided with grooves 60 and 62, respectively, and O-rings 64 and 66 are disposed within each of the grooves 60 and 62, respectively. The O-rings 64 and 66 seal the end portions 56 and 58 to the interior surface of the sleeve 28.

A cylindrical spring guide 68 is disposed in the restricted portion 22 of the bore 20 at the end of the bore opposite its mouth 24, and a spiral spring 70 extends from the spring guide 68, that is, toward the mouth 24 of the bore 20. The threaded spacer 30 is provided with a central axial channel 72 which has an outwardly extending shoulder 74 adjacent to the sleeve 28, and a control stem 76 is slidably disposed within the channel 72. The stem 76 has an outwardly extending flange 78 which is adapted to engage the shoulder 74 and form a stop, when forced toward the shoulder by the spring 70. The spring 70 is of sufficient strength to force the spool 52 into abutment with the flange 78 and the flange into abutment with the shoulder 74 unless an external force is applied to the control stem 76 in the reverse direction.

It will be noted that FIGURE 1 illustrates the spool 52 in its position adjacent to the mouth 24 of the bore 20, and that in this position the apertures 38 are in communication with the second outlet port 36. As a result, the inlet port 32 is in fluid communication with the second outlet port 36 by means of the groove 40 and apertures 38. Also, the inlet port 32 is sealed from the first outlet port 34 by the end portion 58 of the spool 52 and its O-ring 66. In this position, the control stem 76 extends outwardly from the end wall 16 to its maximum position.

FIGURE 6 illustrates the valve in its opposite condition, that is, with the inlet port 32 in fluid communication with the first outlet port 34 but sealed from the second outlet port 36. In this condition, the control stem 76 has been forced to its maximum position toward the closed end of the bore 20 and against the spring bias of the spiral spring 70. As a result, the spool 52 has been moved away from the mouth 24 of the bore 20 and positions the end 58 of the spool between the second outlet port 36 and the apertures 38. Hence, the O-ring 66 forms a seal between the inlet port 32 and the second outlet port 36 to prevent fluid passing through the inlet port, the groove 40, and the apertures 38 from reaching the second outlet port 36. However, the restricted portion 54 of the spool 52 extends from the apertures 38 to the apertures 44 thereby connecting the inlet port 32 with the outlet port 34 through the apertures 44 and the groove 42. In this manner, the valve has affected switching of the flow of fluid entering the inlet port 32 from the second outlet port 36 to the first outlet port 34. It will be apparent that by merely plugging the second outlet port 36, the valve may be made to operate simply as a flow controlled valve permitting a flow of fluid or no flow of fluid from the inlet port 32 to the outlet port 34.

The actuator mechanism is designated 80 in the figures and has a quadrangular block 82 with a flat surface 84 which abuts the surface 16 of the block 10 of the valve. The surface 84 is provided with an elongated slot 86 which extends therein from a side wall 88 of the block 82, but the slot 86 does not extend through to the opposite side wall 90. A rectangular aperture 92 extends from the slot 86 to the end wall 94 opposite the surface 84. The block 82 also has side walls 96 and 98 which extend between the end wall 94 and the surface 84 to complete the quadrangular block.

A block shaped control member 100 is slidably disposed within the slot 86 in the block 82. The block 100 has a rectangular cross section generally conforming to the cross section of the slot 86, and a length shorter than the length of the slot 86. The slot 86 does not extend through the side wall 90 of the block 82, and the block 100 terminates its translation movement in a direction toward the side wall 90 in abutment with the block at this end of the slot 86. The block 100 has a first indentation 102 confronting the control stem 76 of the valve structure. This indentation 102 has a surface 104 which is flat and disposed at an acute angle to the channel 72 of the spacer 30. In like manner, the stem 76 has a flat surface 106 which is parallel to the flat surface 104. Also, the flat surfaces 104 and 106 are disposed in planes traversing the central axis of the slot 86 normally.

The block 100 also has a second recess 108 which is provided with a pair of end surfaces 110 and 112 which are disposed normal to the central axis of the slot 86 and parallel to the axis of the channel 74. A control arm 114 is mounted centrally of the opening 92 pivotally on a pin 116, and the end of the control arm 114 nearest the surface 84 penetrates the recess 108 and is designated 118. This end 118 of the control arm 114 is adapted to engage the parallel walls 110 and 112 of the recess 108 to translate the block 100 along the slot 86. In FIGURE 1, the block 100 is disposed at its innermost portion of the slot 86, and the surface 112 is illustrated as abutting the end 118 of the arm 114. It is to be noted that the end 118 is of restricted cross section from other portions of the arm in order to permit the arm 114 to be pivoted throughout a slightly greater angle. In FIGURE 6, it is to be noted that the end 118 of the arm 114 is disposed adjacent to the surface 110, indicating that the block 100 is translated to its maximum position from the closed end of the slot 86. FIGURE 1 illustrates in dotted lines the position of the control arm 114 required to achieve the position of the block 100 illustrated in that figure, and FIGURE 6 illustrates in dotted lines the position of the control arm 114 required to cause the block 100 to assume the position there illustrated.

It is to be noted that in assuming the position of FIGURE 6, the block 100 has been translated to cause the flat surface 104 of the block to engage the flat surface 106 of the control stem 76, thereby depressing the control stem 76 against the spring 70 and causing the control stem to be forced into engagement with the under surface of the block 100, designated 120. This undersurface 120 of the block 100 maintains the stem 76 in its depressed position, and the undersurface 120 is provided with an indentation 121 at the region of contact of the control stem 76, and the indentation 121 accommodates the end of the control stem 76 to retard translation of the block 100 in the absence of actuation of the control arm 114.

It is to be noted that the control arm 114 may be pivoted to its initial rest position from the extremes of both of its actuation positions without translating the block 100, that is, the dashed line of FIGURE 1 and the solid line of FIGURE 1 for the control arm 114 are both possible without moving the block 100 and the dashed line and solid lines for the control arm 114 of FIGURE 6 are both permissible without moving the block 100. A spring biased mechanism operable on the control arm 114, designated 122, is provided to cause the control arm 114 to assume its rest position in the absence of actuation at all times, this rest position being on the axis of the channel 72. This mechanism 122 is disposed within a threaded bore 124 disposed in the plane of the control arm 114 and extending normal to the axis of the channel 72. A threaded plug 126 is disposed within the bore 124 and is provided with an axial cylindrical recess 128. A cylindrical guide 130 is translatedly disposed within the recess 128 and is itself provided with a cylindrical recess 132. A spiral spring 134 extends throughout the recess 128 and the recess 132 of the guide 130 to spring bias the guide in a direction toward the control arm 114. The end of the guide 130 opposite the plug 126 terminates in a flat surface 136 which abuts the flat side surface 138 of the control arm 114. The surface 136 is disposed parallel to the axis of the channel 72 and is for the purpose of forcing the control arm 114 in alignment with the axis of the channel 72. It is to be noted that the control arm 114 has a rectangular cross section in the present application, but it is only necessary that the surface of the guide 130 conform to the surface of the control arm 114 and be at the same angle to the axis of the channel 32 as the control arm 114 in its rest position, thus permitting other configurations for the cross section of the control arm 114 and different rest positions for the control arm 114.

The actuating mechanism 122 may be integral with the valve, that is, disposed within the block 10. However, in the particular construction the actuating mechanism 122 has been provided with its own block 82 so that it may be utilized with other valves than the one illustrated which have the same actuating stem 76, and a pair of threaded bolts 140 extend through the block 82 and engage the block 10 to secure the actuating mechanism 122 on the valve.

FIGURE 9 illustrates a modification of the toggle valve construction illustrated in FIGURES 1 through 6, and the valve of FIGURE 9 is identical to that of FIGURES 1 through 6 except for the block 100A which corresponds to the block 100 of FIGURES 1 through 6. In FIGURE 9, those elements which are identical with the construction of FIGURES 1 through 6 are identified by the same reference numerals as used in FIGURES 1 through 6. The block 100A is identical to the block 100 except for the shape of the indentation 102, designated 102A in FIGURE 9.

The indentation 102A loosely accommodates the end of the stem 76 when the block 100A is in its rest position. The surface 104 of the block 100A is then disposed parallel and adjacent to the surface 106 of the stem, and the indentation 102A also has a surface 142A parallel to the surface 142 of the stem, and a surface 144A parallel to the surface 144 of the stem. The length of the surface 142A of the block 100A, as measured between the surfaces 144A and 104, is slightly longer than the surface 142 of the stem 76 as measured between the surfaces 144 and 106 in order to provide the loose fit.

The indentation 102A, in the actuating position shown in FIGURE 9, is shifted slightly to the left of the axis of the stem 76, but the surface 104 remains in contact with the surface 106 of the stem and the surface 120 of the block 100A never reaches contact with the surface 142 of the stem 76. Hence, when the control arm 114 is released (from the position shown in FIGURE 9), the spring biased mechanism 122 will cause the control arm 114 to become aligned with the axis of the stem 76 and will release the block 100A for translation. The spring pressure exerted on the stem 76 is transmitted from the surface 106 of the stem to the surface 104 of the block 100A, causing the block to be translated to the right in FIGURE 9. In this manner, the valve connections are restored to the rest position. It is to be noted that the only time the valve connections are in the actuated position is during that period of time when a force is applied to the control arm 114, and that the valve will automatically return to its rest position connections when the control arm 114 is released. Also, it should be noted that the valve connections are altered from the rest position only when the control arm 114 is pivoted in a clockwise direction as viewed in FIGURE 9, since pivoting in the counterclockwise direction will not cause the control arm to translate the block 100A, there being sufficient space between the control arm 114 and the surface 110 of the block 100A in the rest position to accommodate the full angular displacement of the control arm 114.

FIGURE 7 illustrates a toggle valve assembly which constitutes a further embodiment of the present invention. The valve and valve block 10 are identical to that described in FIGURES 1 through 6, and bear the same reference numerals, with the exception that the valves control stem 76A has been modified from that shown in FIGURES 1 through 6. It is to be noted that in FIGURES 1 through 6, the stem 76 is illustrated as having a short flat surface 142 by virtue of the flat inclined surface 144 disposed on the side of the surface 142 opposite the inclined surface 106. The purpose of this construction is to reduce the friction between the surface 120 of the block 100 when the valve has been actuated by sliding the block to the position illustrated in FIGURE 6. In the valve of FIGURE 7, the flat surface 142A normal to the axis of the channel 72 extends from the surface 106 across the entire remaining surface of the control stem 76. Also, FIGURE 7 illustrates a modified actuation mechanism designated 80A.

The actuation mechanism 80A employs a block 146 which is similar to the block 82 of the actuation mechanism 80 except that the slot 86 does not extend to the exterior surfaces of the block but is in the form of a recess 86a and the bore 124 for the mechanism 122 is omitted. Since other portions of the block 146 correspond to that of the block 82, like reference numerals will be used for identification purposes.

The control arm illustrated in FIGURE 7 is modified from that of FIGURES 1 through 6 and designated 114A. The control arm is pivoted on a pin 116, and is provided with an opening 148 between the pin 116 and the control stem 76A. A rod 150 is translatedly disposed within the opening and provided with lock nuts 152 and 154 on opposite sides of the opening 148. The rod 150 is attached at one end to an L-shaped bracket 156 which is slidably disposed in abutment with the surface 16 of the block 10. The portion of the bracket 156 which is in abutment with the surface 16, designated 158, is maintained in position by a pair of clamps 160 and 162, and the portion 158 of the bracket 156 is provided with an aperture 164 which accommodates the exposed portion of the control stem 76A.

In FIGURE 7, the valve is shown with the stem 76A protruding upwardly through the aperture 164 of the bracket 156 to place the valve in the same operational condition illustrated in FIGURE 1 for the embodiment of FIGURES 1 through 6. This has been achieved by pivoting the control arm 114A in a counterclockwise direction, as viewed in FIGURE 7, to cause the portion of the control arm adjacent to the opening 148 to abut the stop 154. When the control arm 114A is pivoted in the clockwise direction as viewed in FIGURE 7, the portion of the control arm adjacent to the opening 148 abuts the stop 152 and transmits force through the rod 150 to the bracket 156 to translate the portion 158 of the bracket toward the left. As a result, the aperture 164 will override the control stem 76A, and engage the incline surface 106 to depress the control stem 76A beneath the portion 158 of the bracket 156. The valve of FIGURE 7 thus will assume the operational position illustrated in FIGURE 6 for the embodiment of FIGURES 1 through 6.

FIGURE 7 also illustrates another mechanism 122A for returning the control arm 114A to a rest position, in this construction, a position in alignment with the axis of the channel 72 or the control stem 76A. In this mechanism, a pair of leaf springs 164 and 166 are mounted at one end within the recess 86A on the block 146 and abut opposite sides 138 and 168 of the control arm 114A, the cross section of the control arm 114A being square as in the case of the control arm 114. The leaf springs 164 and 166 have a normal bend centrally thereof designated 170 and apply equal force to the opposite surfaces 138 and 168 of the control arm 114A to cause the control arm to assume a rest orientation aligned with the axis of the channel 72.

FIGURE 8 illustrates a third actuation mechanism 80B mounted on the same valve as illustrated in FIGURES 1 through 6, except for a further modification of the control stem thereof. Hence like reference numerals are illustrated in FIGURE 8 for parts identical with those illustrated in FIGURES 1 through 6. The control stem is designated 76B and differs only in that the end of the control stem comprises simply a flat surface 172 normal to the axis of the channel 72. In FIGURE 8, the control arm 114 is identical to that illustrated in FIGURES 1 through 6, and the mechanism for returning the control arm 114 to the rest position is also identical to that of FIGURES 1 through 6 and identified as 122. The block for the actuator means 80B is identical to that illustrated in FIGURES 1 through 6 except the channel 86B extends through the entire block and the block has been designated 174.

A generally quadrangular block 176 is translatedly disposed within the channel 86B on one side of the control stem 76B, behind the control stem 76B as illustrated in FIGURE 8. The block 176 has a recess 178 confronting the control arm 114, the recess being essentially identical to the recess 108 of FIGURES 1 through 6 and the control arm 114 being disposed within the recess 178 in the manner of FIGURES 1 through 6.

The block 176 carries a pin 180 on the side of the block 176 confronting the control stem 76B, and a cylindrical roller 182 is rotatably mounted on the pin 180. A bracket 184 is disposed between the roller 182 and the control stem 76B. The bracket is pivoted at its end remote from the control stem 76B on a pin 186 mounted directly to the block 174. The bracket 184 has three adjacent portions extending from the pin, designated 188, 190, and 192. The portion 188 and the portion 192 are parallel to each other, and the portion 190 disposed therebetween is at an obtuse angle to the portions 188 and 192. The intervening portion 190 is directly disposed between the roller 182 and the control stem 76B of the valve, and the portion 192 is disposed essentially parallel to and adjacent to the flat surface 172 of the control stem 76B.

As illustrated in FIGURE 8, the control arm 114 has been pivoted in a counterclockwise direction to translate the block 176 to its maximum position toward the right, thereby causing the roller 182 to become disengaged from the bracket 184 and permitting the valve stem 76B to assume its maximum extension from the block 10 by virtue of its spring bias in this direction. As a result, the valve will be in the operative condition illustrated in FIGURE 1 for the embodiment of FIGURES 1 through 6. Upon rotation of the control arm 114 in the clockwise direction, the block 176 will be translated to the left, as viewed in FIGURE 8, thus causing the roller 182 to engage the inclined surface 190 of the bracket 184 and force the portion 192 of the bracket 184 into abutment with the flat surface 172 of the control stem 76B, thereby depressing the control stem 76B to cause the valve to assume the operative conditions of FIGURE 6 for the embodiment of FIGURES 1 through 6. It is to be noted that there is no force transmitted from the valve stem 76B to the block 176 to cause it to assume any particular rest position, and therefore, the control arm 114 may be returned to its rest position in all cases under actuation by the mechanism 122.

From the foregoing disclosure, those skilled in the art will readily devise many modifications to the structures herein set forth and many applications of the present invention beyond those here described. It is therefore intended that the scope of the present invention be not limited by the foregoing disclosure but rather only by the appended claims.

The invention claimed is:

1. A valve and actuator assembly for controlling the flow of a fluid medium comprising a valve having a valve block with an inlet port and an outlet port, said block having a cavity therein and a channel extending from the cavity to a mouth on the surface of the valve block, means translatable within the cavity along the axis of the channel for controlling the volume of fluid adapted to flow from the inlet port to the outlet port including a control stem translatable in the channel and extending to the exterior of the valve block, a member disposed exterior of the cavity and slidably in abutment with the surface of the valve block adjacent to the mouth of the channel, said member being translatable along an axis normal to the control stem, means carried by said member for engaging and depressing the control stem when the member is disposed in one position along its translatable axis and releasing the control stem when the member is disposed in another position along its translatable axis, and a means operatively associated with the member for moving the member along its translatable axis between said two positions responsive to a force to affect actuation of the valve.

2. A valve and actuator assembly comprising the elements of claim 1 wherein the means carried by the member for engaging and depressing the control stem comprise a shoulder adapted to slide into engagement with a surface of the control stem confronting the shoulder, said surface of the control stem being disposed at an acute angle to the shoulder of the member.

3. A valve and actuator assembly comprising the elements of claim 1 wherein the means carried by the member for engaging and depressing the control stem of the valve comprises a bracket pivotally mounted on the block at one end and confronting the end of the control stem at the other end, said bracket having a portion disposed between the ends thereof disposed at an acute angle to the axis of the control stem, and a protrusion mounted on the movable member on the side of the bracket opposite the control stem and spaced from the surface upon which the movable member is disposed by a distance approximately the same as the portion of the bracket disposed at an acute angle to the axis of the control stem.

4. A toggle valve and actuator assembly comprising the elements of claim 1 wherein the means operatively associated with the member for moving the member between two positions comprises an arm pivotally mounted on the block between the ends thereof, the member being provided with an indentation confronting the adjacent end of the arm, and the adjacent end of the arm being disposed within the indentation.

5. A valve and actuator assembly for controlling the flow of a fluid medium comprising a valve having a valve block with an inlet port and an outlet port, said block having a cavity therein and a channel extending normal to a flat surface of the valve block from the cavity to a mouth on said surface, means disposed within the cavity for controlling the volume of fluid adapted to flow from the inlet port to the outlet port including a control stem translatable in the channel and extending to the exterior of the valve block, said control stem having an end surface and a second surface extending from the end surface disposed at an acute angle to the axis of the channel, spring bias means disposed within the cavity urging the control stem outwardly of the channel, stop means having an element disposed on the control stem and an engaging element on the block for limiting translation of the control stem outwardly of the channel, the control stem protruding from the channel to expose the end and second surfaces of the stem when the elements of the stop means engage each other, a control member having a flat surface and a shoulder extending inwardly from the flat surface thereof, means for mounting the control member exterior of the block with the flat surface of the control member in slidable abutment with said flat surface of the block and the shoulder of the control member confronting the second surface of the control stem, said control member being confined to translation along a straight axis, and an actuator mechanism for translating the control member between two positions on said axis, one of said positions placing the surface of the control member in abutment with the end surface of the control stem to translate the control stem inwardly of the block and maintain the control stem interiorly of the block.

6. A toggle valve and actuator assembly comprising the elements of claim 5 wherein the control member comprises a solid block having an indentation on one side forming the shoulder thereof said block having a second indentation on the opposite side thereof having generally parallel walls disposed normal to a plane normal to the shoulder of said block, and the actuator mechanism comprises an arm pivotally mounted on the valve block between the ends thereof with one end confronting the second indentation and disposed therein, the thickness of the end of the arm disposed within the second indentation in said plane normal to the shoulder of the first indentation being less than the distance between the surfaces of the second indentation, whereby the arm may be pivoted on its axis to translate the block to either of the positions thereof and returned to a neutral position.

7. A toggle valve and actuator assembly comprising the elements of claim 6 in combination with spring bias means mounted on the valve block and operatively associated with the arm for aligning the arm with a neutral axis disposed between the two positions of said arm achieving translation of the control block to its two positions.

8. A toggle valve and actuator assembly comprising the elements of claim 7 wherein the spring bias means actuable upon the arm comprises means defining a cylindrical bore normal to the channel of the control stem disposed on an axis normally intersecting the pivotal axis of the arm, a spring guide translatably disposed within the bore having an end extending therefrom provided with a surface parallel to the axis of the channel conforming to the confronting surface of the arm, and a spiral spring disposed within the bore between the guide and the means defining the bore urging the guide toward the arm.

9. A toggle valve and actuator assembly comprising a combination of claim 5 wherein the control member is provided with a shallow indentation in the surface therein adjacent to the shoulder thereof, said shallow indentation confronting and engaging the end surface of the control stem in the one position of the control member to restrict translation thereof.

10. A valve and actuator assembly for controlling the flow of a fluid medium comprising a valve having a valve block with an inlet port and an outlet port, said block having a surface and a cavity therein and a channel extending normal to the surface of the block from the cavity to a mouth on said surface, means within the cavity for controlling the volume of fluid adapted to flow from the inlet port to the outlet port including a conrol stem translatable in the channel and extending to the exterior of the valve block, said control stem having an end surface and a second surface extending from the end surface disposed at an acute angle to the axis of the channel, spring bias means disposed within the cavity urging the control stem outwardly of the channel, stop means having an element disposed on the control stem and an engaging element on the block for limiting translation of the control stem outwardly of the channel, the control stem protruding from the channel to expose the end and second surfaces of the stem when the elements of the stop means engage each other, a control member having a surface and a shoulder extending inwardly from the surface thereof, means for slidably mounting the control member for translation along an axis with the surface thereof in abutment with the surface of the block and the shoulder of the control member confronting the second surface of the control stem, means limiting translation of the control member between two extreme positions along the translation axis, the one position maintaining only a portion of the shoulder of the control member in abutment with the second surface of the stem and forcing the stem into the block and the other position of the control member permitting the control stem to protrude unrestrictedly from the block, and an actuator mechanism for translating the control member between the two positions, said actuator mechanism permitting free translation of the control member in the absence of actuation.

11. A toggle valve and actuator assembly comprising the combination of claim 10 wherein the control member comprises a solid block having an indentation on one side forming the shoulder thereof, said block having a second indentation on the opposite side thereof having generally parallel walls disposed normal to the surface of said block, and wherein the actuator mechanism comprises an arm pivotally mounted on the valve block between the ends thereof with one end confronting the second indentation and disposed therein, the thickness of the end of the arm disposed within the second indentation in the plane normal to the parallel walls of the second indentation being less than the distance between the parallel surfaces of the second indentation, whereby the arm may be pivoted on its axis to translate the block to either of the positions thereof and returned to a neutral position therebetween.

12. A toggle valve and actuator assembly comprising the combination of claim 10 in combination with spring bias means mounted on the valve block and operatively associated with the arm for aligning the arm with a neutral axis disposed between the two positions of said arm achieving translation of the control block to its two positions.

13. A toggle valve and actuator assembly comprising the combination of claim 12 wherein the spring bias means actuable upon the arm comprises means defining a cylindrical bore normal to the channel of the control stem disposed on an axis normally intersecting the pivotal axis of the arm, a spring guide translatably disposed within the bore having an end extending therefrom provided with a surface parallel to the axis of the channel conforming to the confronting surface of the arm, and a spiral spring disposed within the bore between the guide and the means defining the bore urging the guide toward the arm.

14. A valve and actuator assembly for controlling the flow of a fluid medium comprising a valve having a valve block with an inlet port and an outlet port, said block having a surface and a cavity therein and a channel extending normal to the surface of the block from the cavity to a mouth on said surface, means within the cavity for controlling the volume of fluid adapted to flow from the inlet port to the outlet port including a control stem translatable in the channel and extending to the exterior of the valve block, said control stem having an end surface and a second surface extending from the end surface, spring bias means disposed within the cavity urging the control stem outwardly of the channel, stop means having an element disposed on the control stem and an engaging element disposed on the block for limiting translation of the control stem outwardly of the channel, the control stem protruding from the channel to expose the end and second surfaces of the stem when the elements of the stop means engage each other, a control member having a surface and a shoulder extending inwardly from the surface thereof, the shoulder being disposed at an acute angle to one of the surfaces of the control stem, means for slidably mounting the control member for translation along an axis with the surface thereof in abutment with the surface of the block and the shoulder of the control member confronting the control stem, means limiting translation of the control member between two extreme positions along the translation axis, the one position maintaining only a portion of the shoulder of the control member in abutment with the stem and forcing the stem into the block and the other position of the control member permitting the control stem to protrude unrestrictedly from the block, and an actuator mechanism for translating the control member between the two positions, said actuator mechanism permitting free translation of the control member in the absence of actuation.

References Cited

UNITED STATES PATENTS

| 992,375 | 5/1911 | Moffitt | 251—229 |
| 2,997,063 | 8/1961 | Anderson et al. | 251—263 |

WILLIAM F. O'DEA, *Primary Examiner.*

D. MATTHEWS, *Assistant Examiner.*